(12) United States Patent
Keil et al.

(10) Patent No.: US 11,385,324 B2
(45) Date of Patent: Jul. 12, 2022

(54) SYSTEM AND METHODOLOGIES FOR AIR SURVEILLANCE AND WEATHER MEASUREMENT

(71) Applicant: Saab Defense and Security USA LLC, East Syracuse, NY (US)

(72) Inventors: John Keil, East Syracuse, NY (US); David Kovarik, East Syracuse, NY (US)

(73) Assignee: SAAB, INC.

( * ) Notice: Subject to any disclaimer, the term of this patent is extended or adjusted under 35 U.S.C. 154(b) by 191 days.

(21) Appl. No.: 16/797,885

(22) Filed: Feb. 21, 2020

(65) Prior Publication Data
US 2020/0271752 A1     Aug. 27, 2020

Related U.S. Application Data

(60) Provisional application No. 62/808,580, filed on Feb. 21, 2019.

(51) Int. Cl.
| | |
|---|---|
| *G01S 7/02* | (2006.01) |
| *G01S 13/91* | (2006.01) |
| *G01S 13/95* | (2006.01) |
| *G01S 13/02* | (2006.01) |

(52) U.S. Cl.
CPC .............. *G01S 7/025* (2013.01); *G01S 13/91* (2013.01); *G01S 13/951* (2013.01); *G01S 2013/0254* (2013.01)

(58) Field of Classification Search
CPC ............................... G01S 13/95; G01S 13/953
See application file for complete search history.

(56) References Cited

U.S. PATENT DOCUMENTS

| | | | |
|---|---|---|---|
| 6,362,774 B1 | 3/2002 | Green | |
| 6,452,536 B1 | 9/2002 | Thomassen | |
| 6,977,610 B2 | 12/2005 | Brookner et al. | |
| 7,920,099 B2 | 4/2011 | Chiu et al. | |
| 8,199,851 B1 * | 6/2012 | Dybdal | H01Q 21/26 |
| | | | 375/295 |
| 8,451,165 B2 | 5/2013 | Puzella et al. | |
| 8,558,735 B2 * | 10/2013 | Bachmann | G01S 7/025 |
| | | | 342/188 |
| 9,225,073 B2 | 12/2015 | Culkin et al. | |
| 9,653,804 B2 | 5/2017 | Pruett et al. | |
| 9,778,357 B2 | 10/2017 | Zhang et al. | |
| 10,775,498 B2 * | 9/2020 | Vacanti | G01S 13/953 |

(Continued)

OTHER PUBLICATIONS

K. D. Hondl, "Multi-Function Phased Array Radar (MPAR)"; slides from a lecture at the National Weather Center in Norman, OK, USA; Feb. 25-27, 2015. (Year: 2015).*

(Continued)

*Primary Examiner* — Bernarr E Gregory
(74) *Attorney, Agent, or Firm* — Barnes & Thornburg LLP

(57) ABSTRACT

A system and methodologies for radar target detection for air surveillance and weather surveillance radar. Embodiments enable the ability to combine radar target detection and tracking with weather surveillance in a single polarimetric Phased Array Radar (PAR) system. Structure and software are provided for performing polarization in a non-orthogonal manner when steering an Active Electronically Scanned Array (AESA) radar off its principal planes.

14 Claims, 4 Drawing Sheets

(56) References Cited

U.S. PATENT DOCUMENTS

2011/0285582 A1* 11/2011 Zhang ............... G01S 13/95
                                              342/26 R
2019/0041493 A1*  2/2019 Greenberg .......... G01S 7/026

OTHER PUBLICATIONS

J. Herd et al., "Multifunction Phased Array Radar (MPAR) for Aircraft and Weather Surveillance"; published in the Proceeding of the 2010 IEEE Radar Conference (May 10-14, 2010); pp. 945-948; published by IEEE, Piscataway, NJ, USA; INSPEC accession No. 11390302; DOI: 10.1109/RADAR.2010.5494483. (Year: 2010).*

D. S. Zrnic et al., "Agile-Beam Phased Array Radar For Weather Observations"; published in the Bulletin of the American Meteorological Society; vol. 88, No. 11; pp. 1753-1766; published on Nov. 1, 2007; published by the American Meteorological Society, Boston, MA, USA. (Year: 2007).*

Legal Advantage, Patentability Search Report dated Oct. 19, 2018, 22 pages.

Peter W. Moo et al., Multifunction RF Systems for Naval Platforms, Published: Jun. 28, 2018, 37 pages.

Dr. Jeffrey S. Herd, Multifunction Phased Array Radar Panel, Massachusetts Institute of Technology, 2011, 3 pages.

NWRT: End of an Era, URL: https://www.nssl.noaa.gov/about/history/nwrt-decommission/, published Aug. 12, 2016, 12 pages.

* cited by examiner

SYSTEM AND METHODOLOGIES FOR AIR SURVEILLANCE AND WEATHER MEASUREMENT

CROSS-REFERENCE TO RELATED APPLICATIONS

This patent application claims priority to US Provisional Application Provisional Patent Application No. 62/808,580, entitled "SYSTEM AND METHODOLOGIES FOR AIR SURVEILLANCE AND WEATHER MEASUREMENT" filed Feb. 21, 2019, the disclosure of which being incorporated herein by reference in their entirety.

FIELD

The present disclosure relates to systems, components, and methodologies for air surveillance and weather measurement. In particular, the present disclosure relates to systems, components, and methodologies that provide air surveillance and weather measurement Radio Detection And Ranging (RADAR; also referred to as "radar") for Active Phased Array Radar (APAR).

BACKGROUND

Radar systems are conventionally used to detect all manner of objects including aircraft, ships, spacecraft, guided missiles, motor vehicles. Conventionally, radar is also used to detect weather formations to aid in the forecast of weather conditions. Radar systems use radio waves to determine the range, angle, or velocity of objects in order to thereby characterize, position, speed trajectory etc.

Conventional radar systems include a transmitter that produces electromagnetic waves in the radio domain (3 Hz to 3 000 GHz (3 THz)) or microwave domain (300 MHz to 300 GHz), a transmitting antenna, a receiving antenna (often the transmitting and receiving antenna are the same antenna), and a receiver and processor to determine properties of detected objects.

In operation, radio waves from the transmitter reflect off an object and return to the receiver, thereby providing data that may be analyzed to determine the object's location and velocity. More specifically, the transmitting/receiving antenna may be operationally coupled to the radio transmitter to emit a short signal pulse. Subsequently, the antenna is operationally coupled to the receiver which amplifies any "echos" from target objects. By measuring the time it takes for the signal to return, the radar receiver can determine the distance to the object. Additionally, the receiver may send the resulting output to a display for output to a human operator(s).

Conventional uses for terrestrial and marine radar systems are used to perform air and ground traffic control, air-defense, terrestrial and marine navigation and collision avoidance systems as well as meteorological precipitation monitoring.

SUMMARY

Disclosed embodiments provide radar target detection for air surveillance and weather surveillance radar.

Disclosed embodiments enable the ability to combine radar target detection and tracking with weather surveillance in a single polarimetric Phased Array Radar (PAR) system.

Disclosed embodiments provide structure and software for performing polarization in a non-orthogonal manner when steering an Active Electronically Scanned Array (AESA) radar off its principal planes.

Disclosed embodiments control rotation of the AESA radar to enable improved weather surveillance in combination with air surveillance.

Disclosed embodiments enable radar detection via each of a plurality of faces of the AESA radar system.

In accordance with disclosed embodiments, structure and software are provided for applying the disclosed innovative concepts to any fixed-face AESA radar that to perform multi-mission operations, e.g., weather measurements at the same time as an air surveillance mission.

Additional features of the present disclosure will become apparent to those skilled in the art upon consideration of illustrative embodiments exemplifying the best mode of carrying out the disclosure as presently perceived.

BRIEF DESCRIPTION OF THE FIGURES

A more complete understanding of the disclosed embodiments and the utility thereof may be acquired by referring to the following description in consideration of the accompanying drawings, in which like reference numbers indicate like features, and wherein:

FIG. 1 illustrates a full 360-degree, fixed-face, dual-polarized, multi-mission AESA radar system, as seen from the outside.

FIG. 2 illustrates a cut-away of the fixed-face, dual-polarized, multi-mission AESA radar of FIG. 1, illustrating additional detail regarding a rotation mechanism provided in accordance with the disclosed embodiments.

FIG. 3 illustrates close-up detailing indicating how cable management for the rotation mechanism may be provided in accordance with the disclosed embodiments.

DETAILED DESCRIPTION

Figure 1:
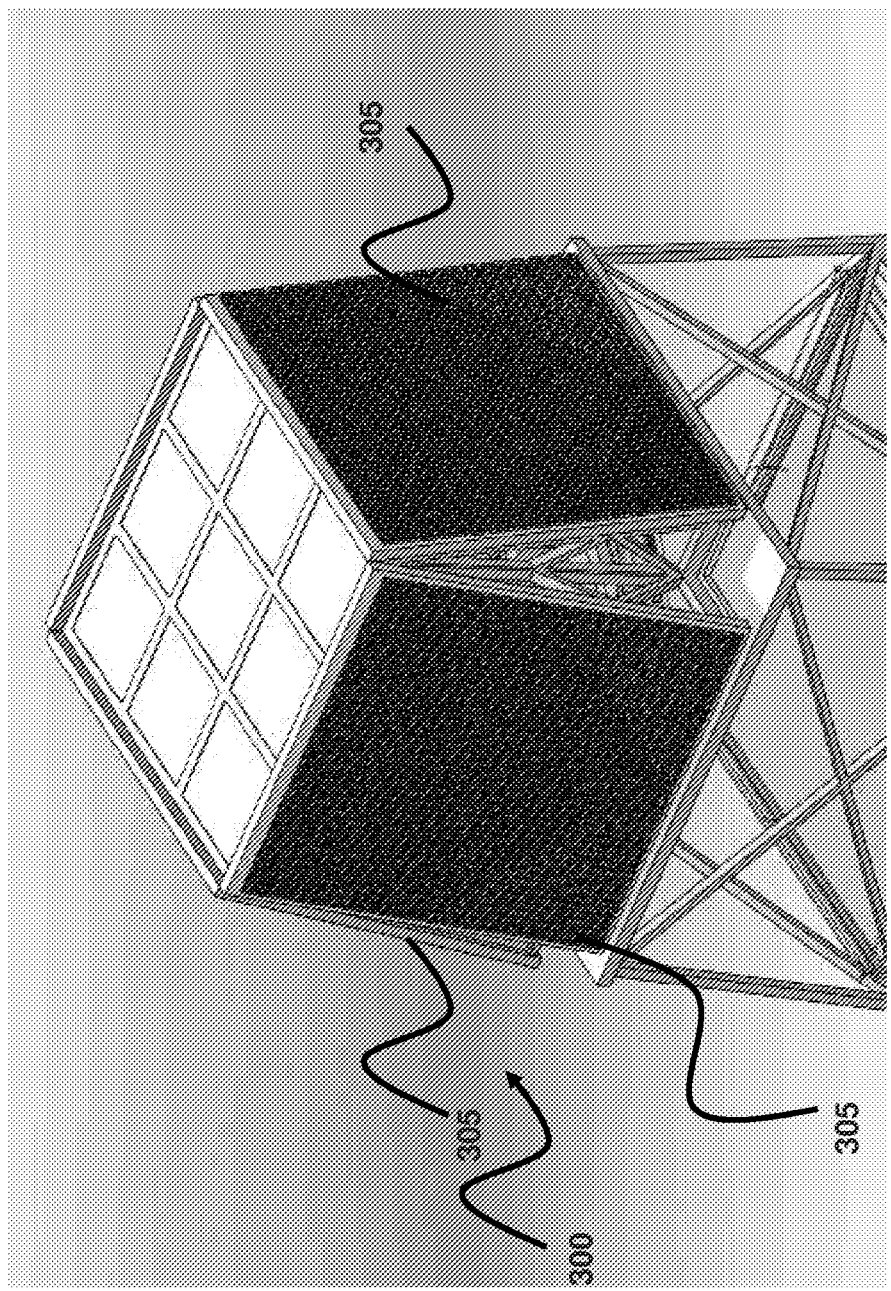
FIGS. 1-3 illustrate a fixed-face, dual-polarized, multi-mission Active Electronically Scanned Array (AESA) radar.

The description of specific embodiments is not intended to be limiting. To the contrary, those skilled in the art should appreciate that there are numerous variations and equivalents that may be employed without departing from the scope of the present invention. Those equivalents and variations are intended to be encompassed by the present invention.

In the following description of various embodiments, reference is made to the accompanying drawings, which form a part hereof, and in which is shown, by way of illustration, various embodiments in which the invention may be practiced. It is to be understood that other embodiments may be utilized and structural and functional modifications may be made without departing from the scope and spirit of the present invention.

The drawings and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

Moreover, it should be understood that various connections are set forth between elements in the following description; however, these connections in general, and, unless otherwise specified, may be either direct or indirect, either permanent or transitory, and either dedicated or shared, and that this specification is not intended to be limiting in this respect.

As is well known, air surveillance and weather measurement both require significant radar time with different operational parameters. For example, conventionally, the different waveforms and update rates required for aircraft surveillance and weather monitoring meant significant compromises in performance between mission-specific operation parameters was necessary. For example, one of the major issues impeding the ability to consolidate operations was that the radar dwell times and 360-degree update times were significantly different between the two radar applications. Conventional radar update times for weather updates are several minutes long, whereas radar update times of twelve seconds or less are required air surveillance. Since these update rates were historically driven by the speed of rotation for a rotating sensor, it was not possible to rotate a single array at speeds optimum to both missions. In addition, weather measurement requires circular polarization to measure the size and shape of airborne water droplets very precisely.

Consequently, conventional air surveillance mission have been accomplished separately from weather measurement using separate "purpose-built" radar systems.

Nevertheless, in order to reduce spectrum utilization, and the cost of two separate radars, it is technically and commercially advantageous and desirable to enable combining these missions into a single radar system. More specifically, the need for spectrum efficiency, in particular the ability such improved efficiency provides to the U.S. Government to vacate and auction off to industry some of the spectrum utilized for these individual missions, drives the need to consolidate these missions.

In particular, the Spectrum Efficient National Surveillance Radar (SENSR) initiative has set a goal to explore solutions for vacating the 1.3-1.35 GHz radio frequency band (currently occupied by the U.S. Federal Aviation Administration (FAA)/U.S. Department of Defense (DoD)/U.S. Department of Homeland Security (DHS) systems) so that part of the frequency spectrum used for various radar applications can be auctioned to the private sector. One conventionally recognized option to achieve that goal was to implement Multifunction Phased Array Radar (MPAR) with the goal of combining aircraft detection and tracking weather surveillance into a single polarimetric Phased Array Radar (PAR) system.

However, even though PAR technology functionality for point targets is well-known conventionally, accurate polarimetric measurements of distributed targets has not conventionally been achieved. Rather, as explained in more detail herein, conventional use of cylindrical and planar architectures for MPAR continue to be investigated but with little success. Planar architectures have been recognized as providing greater flexibility to perform point target and weather functions; however, planar architectures have been recognized as suffering from deficiencies that result in polarimetric weather measurement accuracy. See, for example, "Options for Polarimetric Variable Measurements on the MPAR Advanced Technology Demonstrator," Igor R. Ivić, 2018 IEEE Radar Conference (RadarConf18), April 2018 (hereafter "Ivić").

Ivić considered two approaches to correct for co-polar and cross-polar biases in a radar system operating in Simultaneous Transmission and Reception (STSR) mode; co-polar biases were corrected using co-polar pattern beam peak data while cross-polar pattern effects were suppressed using pulse-to-pulse phase coding. Ivić concluded that such approaches require precise antenna positioning with regard to each calibrated electronic beam steering position, which Ivić recognized as not practical for stationary PAR as envisioned for MPAR.

Thus, it is conventionally recognized that, without establishing and maintaining incredibly complex cross-polar calibration, orthogonality is lost, which results in associated loses of complete circular measurement data. Thus, to date it has been conventionally considered impossible to combine radar target, e.g., aircraft, detection and tracking and weather surveillance into a single polarimetric PAR system in a manner that is practically implementable.

To the contrary, disclosed embodiments enable the ability to combine radar target detection and tracking with weather surveillance in a single polarimetric PAR system by performing polarization in a non-orthogonal manner when steering an Active Electronically Scanned Array (AESA) radar off its principal planes. This innovative concept may be applied to any fixed-face AESA radar that is trying to perform weather measurements at the same time as an air surveillance mission.

In accordance with at least some disclosed embodiments, control of an AESA radar system may implemented, for example, in a radar system of a type the same as, or similar to, Multifunction Phased Array Radar (MPAR) developed by the U.S. National Oceanic and Atmospheric Administration (NOAA), FAA, and the Massachusetts Institute of Technology (MIT) Lincoln Laboratory.

Exemplary embodiments are directed to structure and software for performing rotation or, "nodding," of a conventional, fixed face, dual-polarized AESA radar antenna system to enable improved weather data processing while simultaneously tracking radar targets for surveillance and target direction and management.

AESA radar antenna systems are computer-controlled in such a way that the beam of radio waves can be electronically steered to point in different directions without moving the antenna itself. In such AESA radar antenna systems, each antenna element of the array is connected to solid-state Transmit/Receive Modules (TRMs) under the control of a computer running algorithms to perform the functions of the transmitter and/or receiver for the AESA. Thus, an AESA transmitter, receiver and antenna may be theoretically, considered to be collectively included in each TRM.

In AESA radar systems, the TRMs are arrayed and each TRM generates and radiates its own independent signal. This configuration enables the AESA to simultaneously produce a plurality of "sub-beams" that can be differentiated from one another as a result of the frequency differences. As a result, AESA radar systems can actively track a much larger number of radar targets.

AESA radar systems can also produce beams that consist of a plurality of different frequencies using post-processing of the combined signal from a plurality of TRMs. Thus, conventional AESA radar systems can simultaneously radiate multiple beams of radio waves at multiple frequencies, thereby enabling the ability to spread signal emissions across a wider range of frequencies. This wider transmission frequency spectrum provides various technical advantages including, for example, making AESA radar systems more difficult to detect over background noise, thereby enabling marine and airborne radar to emit more powerful radar signals while remaining safe from detection. Additionally, AESA radar has the ability to simultaneously form multiple beams and concurrently use groups of TRMs for different roles.

Conventionally, it is known to use multiple faces of an AESA antenna to form radar which can scan all sides simultaneously. This minimizes the need for any rotation of a radar system utilizing the antenna.

However, to the contrary, disclosed embodiments extend the capabilities of this operation by performing rotation, or nodding, of a conventional, fixed face, dual-polarized AESA radar antenna system to enable non-orthogonal polarization when steering the AESA radar off its principle planes.

Polarimetric radar systems, such as AESAs, transmit and receive both horizontally and vertically polarized beams. The two polarizations may be transmitted either simultaneously or in an alternating manner. "Dual polarization" means that microwave radiation emitted by the AESA is polarized both horizontally and vertically (with respect to the ground).

However, in polarimetric radar, various factors affecting dual polarization variable accuracy. For example, variation of co-polar gain between H and V channels requires continuous, high-quality calibration and varies with pointing angle for a PAR. Likewise, contamination from the cross-polar signal channel conventionally requires isolation of −25 to −40 dB, which requires hardening electronics coupling, antenna imperfections and (for PAR) "geometric biases." Further, conventional systems require highly accurate matching of H and V beam shapes, which is particularly important for co-polar correlation coefficient variable (pHV).

Nevertheless, recent advances have resulted in a dual-polarized PAR with unique characteristics and capabilities. With careful calibration, the horizontal and vertical polarizations may be combined orthogonally to measure the full height and width profiles of precipitation for weather monitoring. AESAs can also be steered arbitrarily in their horizontal and vertical planes, typically by +/−45 degrees or more in each dimension.

This means a single non-rotating face of an AESA can cover at least a 90-degree volume, and four, fixed faces can be arranged to cover a full 360 degrees. Because these AESA radars have the capability to steer arbitrarily across their Field Of View (FOV), radar designers theoretically have the ability to time multiplex the waveforms required for multiple missions, and steer waveforms arbitrarily to surveil at whatever rate is needed for a given mission. Accordingly, AESAs configured in this way unlock previously impractical multi-mission radar.

Nevertheless, aircraft, detection and tracking and weather surveillance into a single polarimetric PAR system faces an additional obstacle because of the operational parameters associated with those two missions. Thus, some aspects of the resulting polarimetric PAR system still require compromise.

More specifically, when steering an AESA off its principal planes (horizontal and vertical), the orthogonality of the polarizations are degraded because steering occurs in circular space and but the array of TRMS of the AESA is flat. For the weather mission, this non-orthogonality results in a loss of data and inability to measure spherical shapes to the precision required. Also, calibration of the two separate polarized elements is also far more complex because calibration must be performed at each potential steering angle.

Disclosed embodiments overcome the loss of data associated with this non-orthogonality, reduce the complexity of required calibration, and avoid complex, expensive and failure-prone hardware such as slip rings and rotary joints normally associated with a rotating radar. Disclosed embodiments accomplish these points of technical utility by rotating, or nodding, a conventionally fixed face of an AESA radar, disclosed embodiments improve the ability of the dual-polarized AESA radar to perform weather processing as a result of the polarization non-orthogonality occurring when steering the AESA radar off its principal planes.

Conventional systems such as those used in the MPAR program described above provide similar utility but with technical deficiencies that make real world implementation unlikely if not impossible. As indicated in Ivić (referred to above) and various published reports, attempts have been and are being undertaken to address the above-described issue related to non-orthogonal loss of data. Attempts have included advanced calibration algorithms, attempts to modify the shape of the array to minimize the effects, and attempts to algorithmically estimate the missing information. Nevertheless, implementation of those technological solutions has not yielded satisfactory results at this time.

With this understanding of the deficiencies of the conventional art and the need for technical utility innovations in mind, the disclosed embodiments are explained in more detail.

Figure 2:
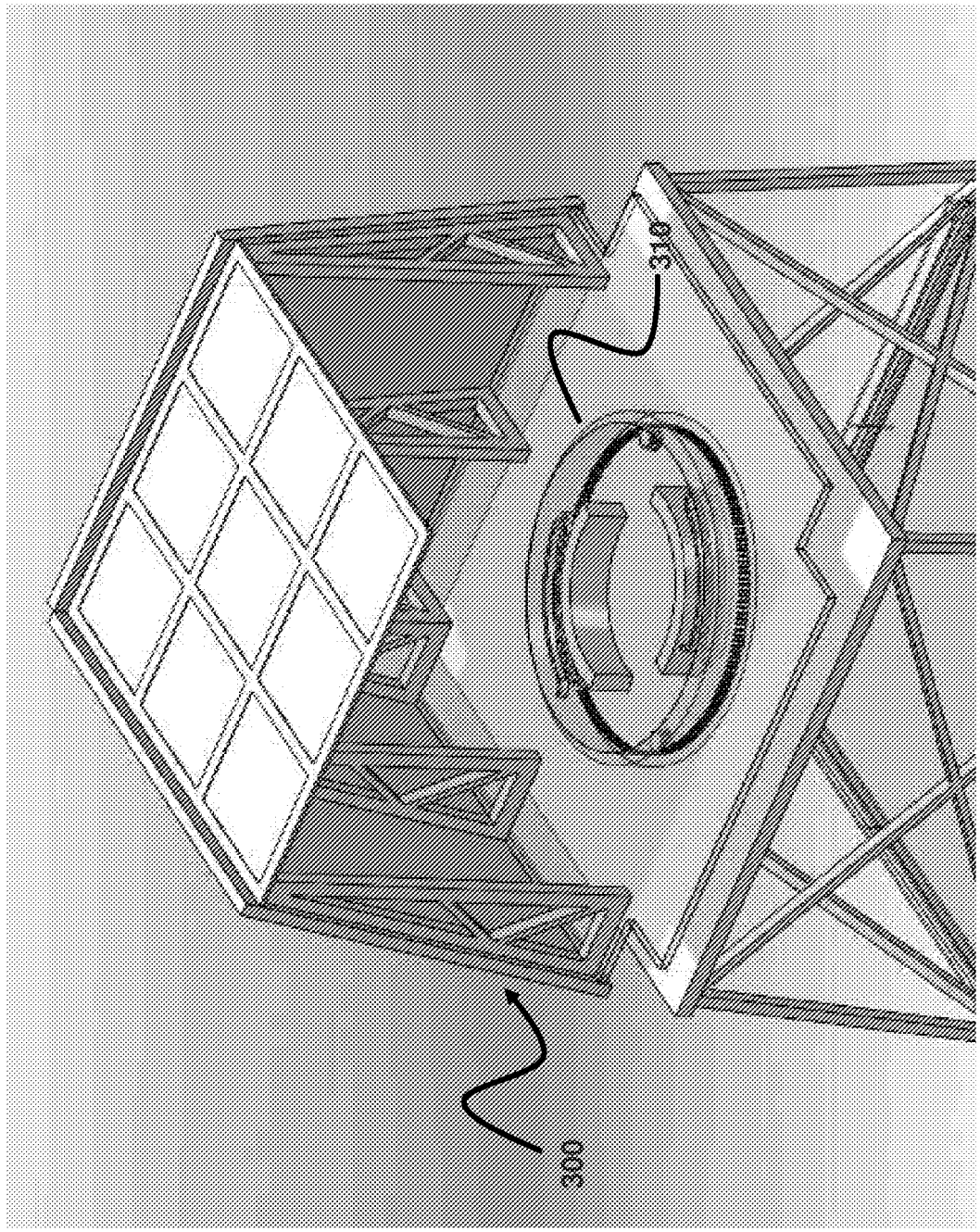
Figure 3:
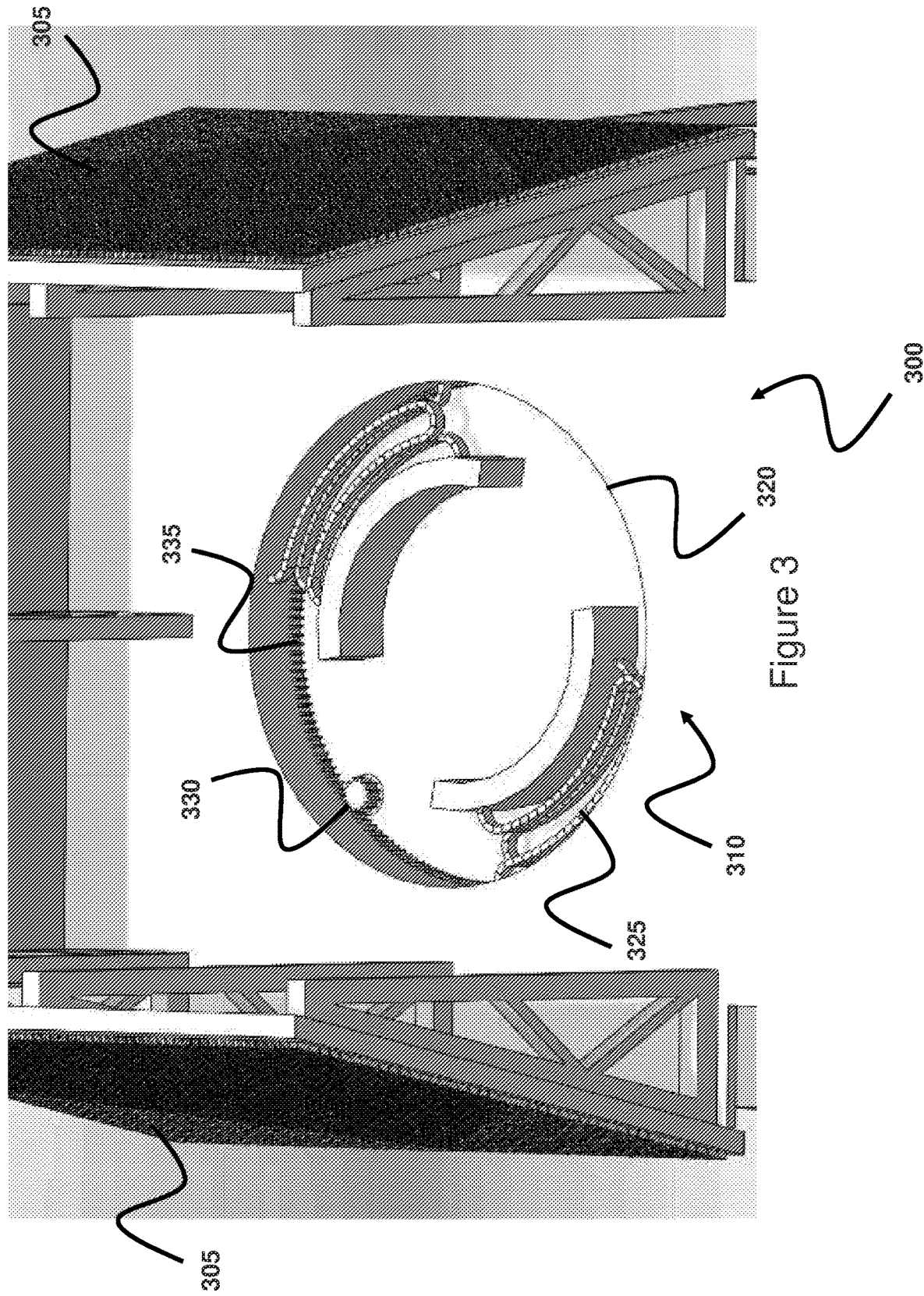

FIGS. 1-3 illustrate a fixed-face, dual-polarized, multi-mission AESA radar array 300 that may be configured in accordance with the disclosed embodiments.

FIG. 1 illustrates a full 360-degree, fixed-face, dual-polarized, multi-mission AESA radar system, as seen from the outside. As shown in FIG. 1, in this example, the array 300 includes four faces 405.

FIG. 2 illustrates a cut-away of the fixed-face, dual-polarized, multi-mission AESA radar of FIG. 1, illustrating additional detail regarding a rotation mechanism provided in accordance with the disclosed embodiments. As shown in FIG. 2, the rotation mechanism 310 included in the interior of the array 300 and provides relative positioning of the array faces to the surrounding environment to provide the functionality disclosed herein.

FIG. 3 illustrates close-up detailing indicating how cable management for the rotation mechanism 310 may be provided in accordance with the disclosed embodiments. As shown in FIG. 3, in particular, the rotation mechanism 310 includes a cable handling system 315 that includes a flexible cable tray 320 including four cable handling assemblies 325 for providing data communication and control functionality for the four array faces 305 of the antenna array 300. The cable handling assemblies 325 provide the ability to maintain communication and control connections regardless of how the array is rotated or nodded. The rotation mechanism provides a mechanism to enable the radar to be rotated back and forth ("nodded") across the FOV of one of its faces. In the case of a four-faced system as shown in FIG. 1-3, this rotation may occur over +/−45 degrees.

The particular implementation for positioning the radar illustrated in FIG. 3 is only one implementation that may be used in accordance with the disclosed embodiments. That particular configuration provides the ability to nod the radar rather than fully rotating it. Nodding the radar instead of fully rotating the radar eliminates the need for a slip ring and a fiber optic rotary joint (or other similar components), which are expensive and failure-prone.

As shown in FIG. 3 positioning of the radar is provided by cooperation of drive pinion 330 (which is coupled to a motor and gear box, not shown but understood to be included in the system 300) and a bowl gear 335, which are under control of a controller. Although not shown in FIG. 3, the bowl gear 335 is attached to a large bearing that has one side fixed to as to enable relative movement as a result of force exerted by interaction with the drive pinion 330 provided by the motor.

Figure 4:
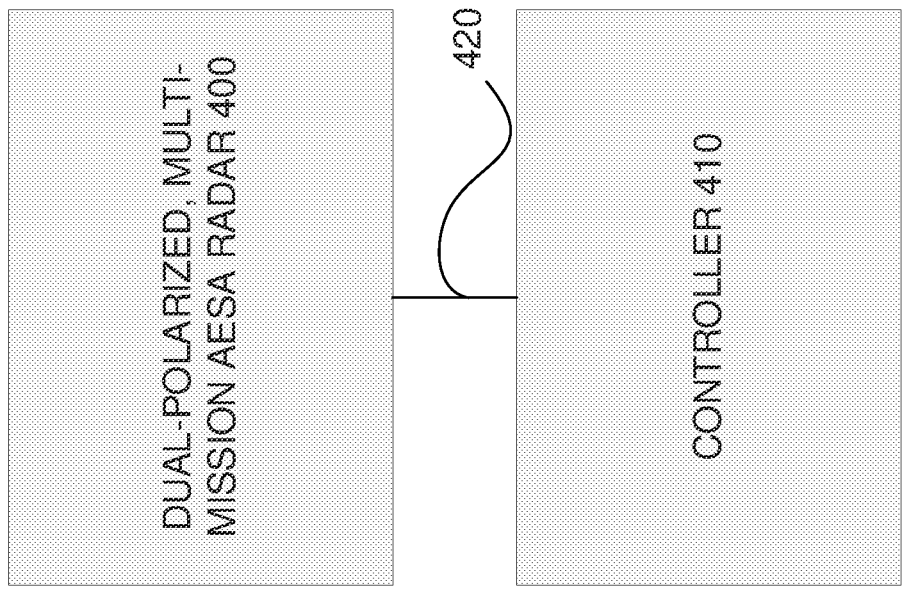
FIG. 4 illustrates AESA hardware coupled to, and under the control of a controller in combination with a cable management rotation mechanism.

As illustrated in FIG. 4, the AESA hardware 400 may be coupled to, and under the control of a controller 410, implemented, for example, using one or more computer processors running software code stored in one or more incorporated or accessible memories, Application Specific Integrated Circuits (ASIC), or the like. Thus, the AESA hardware 400 may be controlled by the controller 410 to nod at a rate commensurate with the scan time required by the radar's weather mission (typically on the order of one or more minutes). Note, the AESA hardware 400 is coupled to the controller 410 via one or cables (not shown) encompassed and managed by a cable management rotation mechanism 420, as explained above.

In accordance with disclosed embodiments control software included in or accessible by the controller 410 may be configured to schedule emission of weather mission waveforms to occur on or near the elevation principal place. Thus, electronic beam steering for the weather mission waveforms may occur primarily in elevation while azimuth steering may be accomplished via the nodding motion of the radar.

In addition to the control of the weather mission waveforms, the radar control software can electronically rotate the beams making up the air surveillance coverage at whatever rate is needed while, time multiplexing this with on-broadside weather beam scheduling.

It should be understood that, since an air surveillance mission does not rely on the radar's dual polarization, there is no loss of data associated with steering the array arbitrarily for the air surveillance mission. Control algorithms for controlling operation scheduling on the nodding radar system may be implemented using, or adapted from, similar algorithms used on maritime air surveillance mission platforms. This is because, on maritime air surveillance mission platforms, the host ship moves and rotates the radar arbitrarily to compensate for ship movement. In the presently disclosed embodiments, the algorithms for providing rotation may be implemented for a different purpose so as to enable the single antenna system to perform air surveillance and weather mission operations together.

Controlling weather mission waveforms to occur primarily in elevation while controlling azimuth steering via the nodding motion of the radar avoids loss of orthogonality (and associated loss of complete circular measurement data) and simplifies the required cross-polar calibration.

Thus, it should be understood that rotation of the AESA is provided in the prescribed manner disclosed herein for providing weather measurement and analysis in combination with those operations in connection with air surveillance. Accordingly, it should be understood that the disclosed embodiments perform rotation of the radar system, as prescribed herein, so as to increase accuracy of weather related data sensed and analyzed in combination with similar operations performed in connection with air surveillance.

It should be understood that the functionality described in connection with various described components of various embodiments may be combined or separated from one another in such a way that the architecture of the resulting system is somewhat different than what is expressly disclosed herein. Moreover, it should be understood that, unless otherwise specified, there is no essential requirement that methodology operations be performed in the illustrated order; therefore, one of ordinary skill in the art would recognize that some operations may be performed in one or more alternative order and/or simultaneously.

Various components of the invention may be provided in alternative combinations operated by, under the control of or on the behalf of various different entities or individuals.

Further, it should be understood that, in accordance with at least one embodiment of the invention, system components may be implemented together or separately and there may be one or more of any or all of the disclosed system components. Further, system components may be either dedicated systems or such functionality may be implemented as virtual systems implemented on general purpose equipment via software implementations.

As a result, although certain embodiments have been described and illustrated in exemplary forms with a certain degree of particularity, it is noted that the description and illustrations have been made by way of example only. Numerous changes in the details of construction, combination, and arrangement of parts and operations may be made. Accordingly, such changes are intended to be included within the scope of the disclosure, the protected scope of which is defined by the claims.

The invention claimed is:

1. A radar system for performing radar target detection for air surveillance and weather surveillance, the radar system comprising:
   a single polarimetric Phased Array Radar (PAR); and
   a controller coupled to and controlling operation of the single polarimetric PAR such that the polarimetric PAR combines radar target detection and tracking operations with weather surveillance operations by performing polarization in a non-orthogonal manner when steering the polarimetric PAR off the principal planes of the radar,
   wherein the controller includes structure and software for performing polarization in a non-orthogonal manner when steering a fixed face, dual-polarized Active Electronically Scanned Array (AESA) radar system of the single polarimetric PAR off its principal planes such that weather measurements are performed in combination with operations for air surveillance, and
   wherein the structure and software for performing polarization rotates the fixed face, dual-polarized AESA radar antenna system to enable improved weather data processing while simultaneously tracking radar targets for surveillance and target direction and management.

2. The radar system of claim 1, wherein the controller controls positioning of a face of a plurality of faces of the AESA radar to enable weather surveillance in combination with air surveillance such that the AESA radar combines the radar target detection and tracking operations with the weather surveillance operations.

3. The radar system of claim 1, wherein the controller controls the AESA radar to perform radar detection via each of a plurality of faces of the AESA radar.

4. The radar system of claim 1, wherein the polarimetric Phased Array Radar performs dual polarization wherein emitted radar signals are polarized both horizontally and vertically with respect to ground.

5. The radar system of claim 1, further comprising a rotation mechanism for rotating the face of the AESA radar under control of the controller to perform weather processing based on a polarization non-orthogonality occurring when steering the AESA radar off principal planes of the AESA radar.

6. The radar system of claim 1, wherein the rotation occurs over +/−45 degrees.

7. The radar system of claim 1, wherein the rotation of the face of the AESA radar under the control of the controller electronically rotates beams emitted by the radar to perform air surveillance coverage while, time multiplexing the emitted beams with on-broadside weather beam scheduling.

8. A method for performing radar target detection for air surveillance and weather surveillance using a radar system, the method comprising:
   performing polarization in a non-orthogonal manner when steering a single polarimetric Phased Array Radar (PAR); and
   controlling operation of the single polarimetric PAR using a controller coupled to the polarimetric PAR such that the polarimetric PAR combines radar target detection and tracking operations with weather surveillance operations by performing the polarization in a non-orthogonal manner when steering the polarimetric PAR off the principal planes of the radar,
   wherein the controller includes structure and software for performing polarization in a non-orthogonal manner when steering a fixed face, dual-polarized Active Electronically Scanned Array (AESA) radar system of the single polarimetric PAR off its principal planes such that weather measurements are performed in combination with operations for air surveillance, and
   wherein the structure and software for performing polarization rotates the fixed face, dual-polarized AESA radar antenna system to enable improved weather data processing while simultaneously tracking radar targets for surveillance and target direction and management.

9. The method of claim 8, wherein the controller controls positioning of a face of a plurality of faces of the AESA radar to enable weather surveillance in combination with air surveillance by such that the AESA radar combines the radar target detection and tracking operations with the weather surveillance operations.

10. The method claim 8, wherein the controller controls the AESA radar to perform radar detection via each of a plurality of faces of the AESA radar.

11. The method of claim 8, wherein the polarimetric Phased Array Radar performs dual polarization wherein emitted radar signals are polarized both horizontally and vertically with respect to ground.

12. The method of claim 8, wherein a rotation mechanism rotates the face of the AESA radar under control of the controller to perform weather processing based on a polarization non-orthogonality occurring when steering the AESA radar off principal planes of the AESA radar.

13. The method of claim 8, wherein the rotation occurs over +/−45 degrees.

14. The method of claim 8, wherein the rotation of the face of the AESA radar under the control of the controller electronically rotates beams emitted by the radar to perform air surveillance coverage while, time multiplexing the emitted beams with on-broadside weather beam scheduling.

* * * * *